J. F. Winchell.
Corn Harvester.
No. 58706.   Patented Oct. 9, 1866.
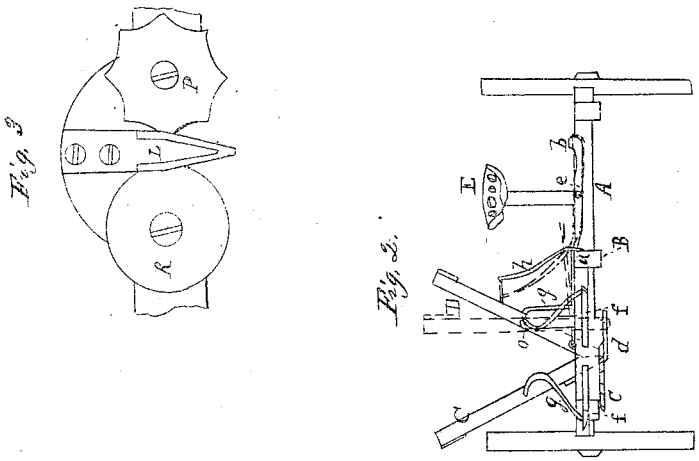
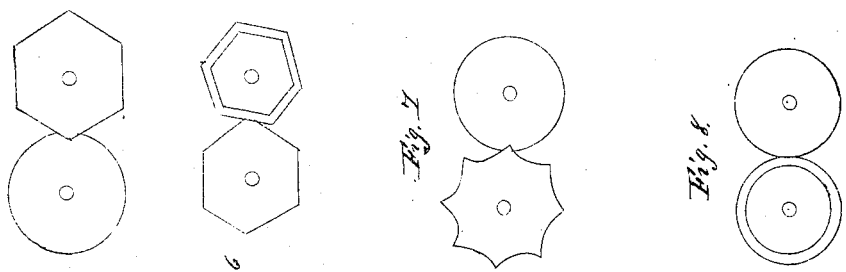
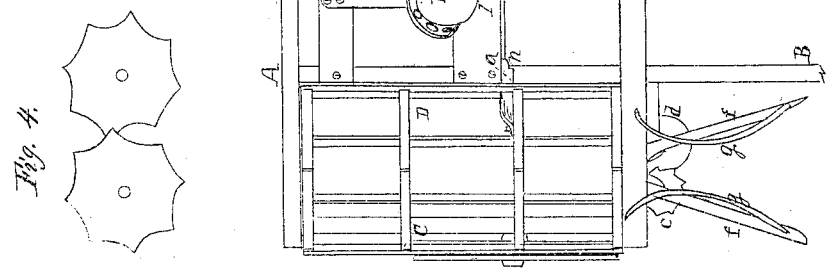
Witnesses.
C. T. Dodge
James F. Winchell
Inventor
By M. Dodge
Attorney.

UNITED STATES PATENT OFFICE.

JAMES F. WINCHELL, OF SPRINGFIELD, OHIO.

IMPROVEMENT IN CORN-HARVESTERS.

Specification forming part of Letters Patent No. 58,706, dated October 9, 1866.

*To all whom it may concern:*

Be it known that I, JAMES F. WINCHELL, of Springfield, in the county of Clarke and State of Ohio, have invented certain new and useful Improvements in Corn-Harvesters; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use the invention, I will proceed to describe it.

Figure 1 is a top-plan view; Fig. 2, a front elevation; Fig. 3, a plan view of a separate cutting apparatus; and Figs. 4, 5, 6, 7, and 8 are views of modified forms of the cutters.

A represents the main frame, which may be made of any required form and size, and is mounted on two wheels, like a cart. This vehicle is provided with a tongue, B, and on one side of the main frame is mounted a seat, E, for the driver.

On the opposite side of the frame is mounted a rack, consisting of two parts, C and D, the former being stationary, and the latter pivoted at o, Fig. 2, so as to permit it to be swung as indicated in red, and thereby separate them at the bottom, for the purpose of permitting the corn-stalks which may have fallen thereon to drop through on the ground.

At the front of the frame A, on the off side of the tongue B, is located the cutting apparatus, consisting of two revolving disks, c and d, as shown in Fig. 1. These cutters are located directly in front of the rack C D, so that stalks cut by them will fall directly over onto the rack.

In order to gather and guide the stalks to the cutters, two diverging arms, f f, protrude horizontally from the front of the frame, as shown in Fig. 1, and from the extremities of these arms rods g extend backward, and are attached to the main frame, as shown in Figs. 1 and 2, these rods being elevated as they recede, for the purpose of guiding the falling stalks into the rack.

A spring, h, is attached to the frame, and connected with the pivoted part B of the rack, as shown in Fig. 2, the tension of which tends to keep the rack closed at the bottom. A bar or rod, a, is also pivoted to the part D, and has its inner end resting on the tongue B, abutting against a stop, n, as shown in Fig. 1.

To the front of the foot-board I, underneath the seat, is pivoted a lever, b, the inner end of which rests under the end of bar a.

It will thus be seen that by pressing the foot upon the outer end of the lever b the inner end will be raised, thereby raising the bar a above the stop, and thus permitting the rack D to turn and discharge its load.

The operation is as follows: A team being attached to the machine, it is drawn forward in such a position as to cause the arms f to embrace or straddle a row of standing corn, which, coming in contact with the cutters, is cut off and falls over into the rack. When a sufficient quantity has been gathered for a bundle, the rack is opened by the weight of the corn, the stop a being raised by pressing the foot on lever b, and the stalks fall to the ground.

The cutters may consist of any of the forms of disks represented in the various figures; and, if desired, they may be rotated by gearing connected with one of the wheels of the machine.

In Fig. 3 I have represented a modification of the cutting apparatus which I propose to use in cases where the corn is very heavy. In this case the disks R and P, instead of being so located as to bring their edges in contact, as shown in the other figures, are placed a little apart, and a blade, L, placed centrally over them, as shown. In this case there will be four cutting-edges instead of two, the disk R cutting against one edge of L, and the disk P cutting against the other edge of L.

It is obvious that two disks of any of the forms shown may be used together, or one of any of the forms may be used in connection with one of any other form, the principle or manner of operating being the same in either case, the only requisite being that the disks shall be arranged so that their cutting-edges shall cut past each other, or past the edge of blade L, in case that be used, like the blades of a pair of shears.

Having thus described my invention, what I claim is—

1. The cutting apparatus consisting of the revolving disks R P, or their equivalents, in combination with the stationary blade L, when said parts are arranged to operate as set forth.

2. The combination of the tilting rack D, stop-bar *a* and lever *b*, and spring *h*, when arranged to operate as herein shown and described.

JAMES F. WINCHELL.

Witnesses:
D. A. HARRISON,
JOHN F. OGLEVEE.